United States Patent Office 3,367,993
Patented Feb. 6, 1968

3,367,993
POLYCARBONATE ELASTOMERS FROM 5,6,7,8-TETRAHYDRO-1,4-NAPHTHALENEDIOLS
John R. Caldwell and Winston J. Jackson, Jr., Kingsport, Tenn., assignors to Eastman Kodak Company, Rochester, N.Y., a corporation of New Jersey
No Drawing. Filed Aug. 9, 1965, Ser. No. 478,430
19 Claims. (Cl. 260—858)

ABSTRACT OF THE DISCLOSURE

Highly elastic polycarbonates are prepared from (A) at least one dihydroxy compound including a tetrahydronapthalenediol, (B) at least one polymer glycol, such as a hydroxy-terminated polyester, and (C) a carbonyl halide, such as phosgene or bromophosgene.

This invention relates to highly elastic polycarbonates and to a method for making such polycarbonates. In particular, the invention is directed to linear, flexible polycarbonates which are valuable in the preparation of elastomeric filaments, fibers, yarns, films and other shaped objects. Specifically, the invention is concerned with novel linear polycarbonate elastomers which are derived from 5,6,7,8-tetrahydro-1,4-naphthalenediols.

It is desirable that elastomers which are to be utilized as fibers, films, etc. have high softening temperature, good tensile properties and high elongation and elastic recovery properties. It is particularly desirable that fibers, filaments and yarns, prepared from elastic polymers, be resistant to conventional drycleaning solvents, and, especially, chlorinated drycleaning solvents such as perchloroethylene.

Various types of polycarbonate resins are known, and, in general, are prepared by the reaction of a dihydroxy aromatic compound with prosgene or a carbonate ester. Such materials generally have relatively good physical and chemical properties but do not achieve the proper balance in solubility properties such that they may be spun from solutions and yet retain relatively high resistance to commercial drycleaning solvents.

Although polycarbonates have been prepared from aromatic 1,4-naphthalenediols, such polycarbonates are entirely different from the polycarbonates of this invention which are derived from dihydroxy compounds of only partially aromatic structure. Because of the partially aromatic structure of the tetrahydronaphthalenediols, the elastomers of this invention are sufficiently soluble so that they can be spun from tetrachloroethane and sufficiently insoluble to be resistant to commercial drycleaning solvents, such as perchloroethylene.

Accordingly, an object of the invention is the provision highly elastic polycarbonates containing units derived from 5,6,7,8-tetrahydro-1,4-naphthalenediols.

A further object of the invention is the provision of polycarbonate elastomers having high softening temperatures, good tensile properties, high elongation and excellent elastic recovery with improved resistance to chlorinated solvents.

Another object of the invention is the provision of polycarbonate elastomers which may be converted into filaments, fibers, yarns, films and other shaped objects.

An additional object of the invention is the preparation of elastomeric polycarbonates by a method which comprises the reaction of carbonyl halide with a 5,6,7,8-tetrahydro-1,4-naphthalenediol and a polymer glycol.

The above objects, and other objects which will become apparent to those skilled in the art, are achieved by the practice of this invention which comprises, briefly, forming a highly elastic polycarbonate by reacting (A) at least one dihydroxy compound including a 5,6,7,8-tetrahydro-1,4-naphthalenediol having the following general formula:

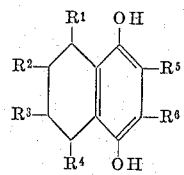

wherein $R^1$, $R^2$, $R^3$ and $R^4$ are hydrogen atoms or alkyl groups containing from 1 to 4 carbon atoms and $R^5$ and $R^6$ are hydrogen atoms, chlorine atoms, bromine atoms, or alkyl groups containing from 1 to 4 carbon atoms with (B) at least one hydroxy-terminated or chloroformate-terminated polyether, polyformal, polyester, aliphatic polycarbonate or poly(ether urethane) and (C) a carbonyl halide.

The 5,6,7,8 - tetrahydro - 1,4 - naphthalenediols of the above general formula are prepared by reacting a butadiene (I) and a p-benzoquinone (II) to obtain a 4α,5,8,8α-tetrahydro-1,4-naphthoquinone (III), rearrangement of the product in the presence of a small amount of a hydrogen halide, such as HCl or HBr, to obtain a 5,8-dihydro-1,4-naphthalenediol (IV) and subsequent catalytic hydrogenation to obtain the 5,6,7,8-tetrahydro-1,4-naphthalenediol (V). The reaction scheme is as follows:

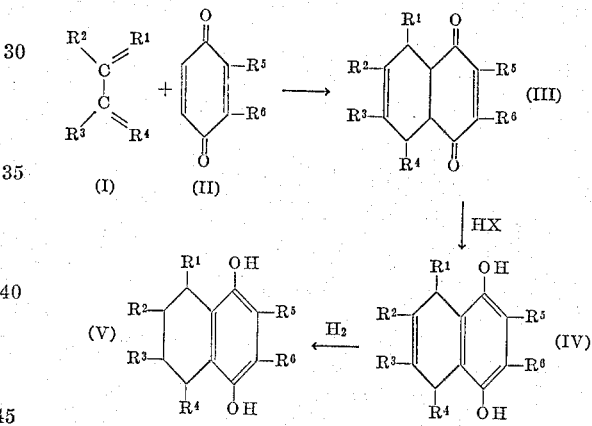

wherein $R^1$, $R^2$, $R^3$, $R^4$, $R^5$ and $R^6$ are the same as defined above. Experimental details are given in Ber., 62, 2361–3 (1929).

Where it is desirable that $R^5$ and $R^6$ of the tetrahydronaphthalenediol starting material are halogen, the above-described reaction scheme is altered, and a butadiene is condensed with a halogenated quinone, such as chloranil, and the condensation product is hydrogenated to yield, for example, 2,3-dichloro-5,6,7,8 - tetrahydro-1,4-naphthalenediol [J. Am. Chem. Soc., 76, 6150 (1954)].

Suitable 5,6,7,8-tetrahydro-1,4-naphthalenediols which are used in accordance with the invention include 5,6,7,8-tetrahydro-1,4-naphthalenediol,
2-methyl-5,6,7,8-tetrahydro-1,4-naphthalenediol,
2-butyl-5,6,7,8-tetrahydro-1,4-naphthalenediol,
2,3-diethyl-5,6,7,8,tetrahydro-1,4-naphthalenediol,
2,3-dichloro-5,6,7,8-tetrahydro-1,4-naphthalenediol,
5,8-dimethyl-5,6,7,8-tetrahydro-1,4-naphthalenediol,
5,8-dipropyl-5,6,7,8-tetrahydro-1,4-naphthalenediol,
6,7-diethyl-5,6,7,8-tetrahydro-1,4-naphthalenediol,
6,7-dimethyl-5,6,7,8-tetrahydro-1,4-naphthalenediol,
2,3-dibromo-5,6,7,8-tetrahydro-1,4-naphthalenediol, and the like. The final elastomeric product may contain from about 5 to about 60 weight percent of the tetrahydronaphthalenediol, although an amount of from about 10 to about 25 weight percent is preferred.

In addition to the tetrahydronaphthalenediol, the polycarbonate composition may contain aromatic dihydroxy compounds including hydroquinone, resorcinol, naphthalenediol and those illustrated by the general formula

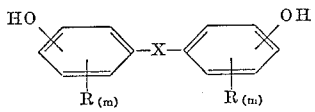

wherein R is hydrogen, chlorine, bromine, nitro, alkyl or alkoxy, $x$ is substituted or nonsubstituted alkyl or cycloalkyl, alkaryl, sulfonyl or radicals having the formulae

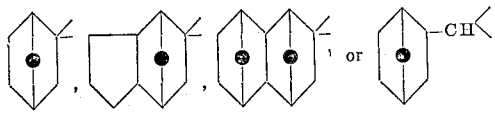

and $m$ is 1, 2, or 3.

Among the aromatic dihydroxy compounds which may be included in the polycarbonate elastomer are 4,4'-isopropylidene-diphenol,
4,4'-cyclohexylidenediphenol,
4,4'-(2-norbornylidene)diphenol,
4,4'-(2-norbornylidene)di-o-cresol,
4,4'-(2-norbornylidene)bis[2,6-dichlorophenol],
4,4'-(hexahydro-4,7-methanoindan-5-ylidene)diphenol,
4,4'-(2-norbornylidene)bis[2,6-dibromophenol],
4,4'-(hexahydro-4,7-methanoindan-4-ylidene)di-o-cresol,
4,4'-(hexahydro-4,7-methanoindan-5-ylidene)bis[2,6-dichlorophenol],
4,4'-(decahydro-1,4:5,8-dimethanonaphth-2-ylidene)-diphenol,
4,4'-(decahydro-1,4:5,8-dimethanonaphth-2-yl-methylene)diphenol,
4,4'-(2-norbornylmethylene)diphenol,
4,4'-(2-norbornylmethylene)bis[2,6-dichlorophenol],
4,4'-(3-methyl-2-norbornylmethylene)diphenol,
4,4'-dihydroxydiphenyl,
2,2'-dihydroxydiphenyl,
2,4'-dihydroxydiphenyl,
4,4'-sulfonyldiphenol,
1,5-naphthalenediol,
2,6-naphthalenediol,
2,4'-dihydroxydiphenyl-methane,
4,4'-(decahydro-1,4:5,8-dimethanonaphth-2-ylidene)-di-o-cresol,
bis-(2-hydroxyphenyl)-methane,
bis-(4-hydroxyphenyl)-methane,
bis-(4-hydroxy-5-nitrophenyl)-methane,
bis-(4-hydroxy-2,6-dimethyl-3-methoxyphenyl)-methane,
1,1-bis-(4-hydroxyphenyl)-ethane,
1,1-bis-(4-hydroxy-2-chlorophenyl)-ethane,
1,1-bis-(2,5-dimethyl-4-hydroxyphenyl)-ethane,
1,3-bis-(3-methyl-4-hydroxyphenyl)-propane,
2,2-bis-(3-phenyl-4-hydroxyphenyl)-propane,
2,2-bis-(3-isopropyl-4-hydroxyphenyl)-propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenyl methane,
bis-(4-hydroxyphenyl)-cyclohexyl methane,
1,2-bis-(4-hydroxyphenyl)-1,2-bis-(phenyl)ethane,
2,2-bis-(4-hydroxyphenyl)-1,3-bis(phenyl) propane,
2,2-bis-(4-hydroxyphenyl)-1-phenyl propane and the like. The final elastomeric product may contain from 0 to about 40 percent by weight of the above-described compounds. Preferably, the product contains from about 15 to about 30 percent by weight of the aromatic dihydroxy compound. Additionally, from about 0.1 to 3 mole percent of a polyphenol, such as 4,4',4"-methylidene-triphenol, may be added to introduce crosslinks.

The hydroxy-terminated or chloroformate-terminated polymers which are added may be polyethers, polyformals, polyesters, aliphatic polycarbonates or poly(ether-urethanes). For convenience they will be referred to as polymer glycols. The average molecular weights may be about 500–5000, but molecular weights of 1500–4200 are preferred. The polymer glycols may be composed of mixtures of low and high molecular weight materials. It is preferred, however, that the glycol be a mixture of polymers with a relatively narrow range of molecular weight. The final elastomeric product may contain 30–85 percent by weight of these short-chain polymers, but the range of 50–70 percent is preferred.

The polyether glycols have the following general formula:

wherein R is a straight-chain or branched-chain alkylene radical containing from 2 to 20 carbon atoms and $x$ is an integer selected to give a polyether having a molecular weight of about 500 to about 5000. Hydroxy-terminated polyvinyl methyl ethers may be used if desired. Poly(tetramethylene oxide) glycol is preferred. It has the following formula:

$$HO(-CH_2CH_2CH_2CH_2O-)_xH$$

wherein $x$ is an integer from about 7 to about 70. Copolyether glycols also may be used, such as a copolymer containing both ethylene oxide and tetramethylene oxide units in the polyether chain. Some of the alkylene radicals in these polyethers may be replaced by arylene or divalent cycloaliphatic radicals.

The polyformal glycols are prepared from aliphatic diols and paraformaldehyde or aliphatic diols and a dialkyl formal in the presence of acidic catalysts:

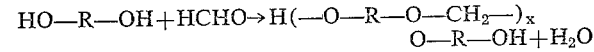

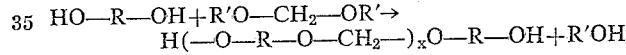

wherein R is a straight-chain or branched alkylene radical containing from 4 to 20 carbon atoms and $x$ is an integer selected to give a polyformal having a molecular weight of about 500 to about 5000. In order to obtain hydroxy-terminated polymers it is necessary to use a slight molar excess of the diol. The diols used in preparing these polyformals may be primary or secondary and may contain 4 to 20 carbon atoms. Copolyformal glycols also may be used, such as a copolymer prepared from both 1,4-butanediol and 1,9-nonanediol. Also these copolymers may be prepared with alicyclic diols, such as 1,4-cyclohexanediol and 2,6-norbornanediol or with cycloaliphatic diols, such as 1,3- and 1,4-cyclohexanedimethanol and 2,5- and 2,6-norbornanedimethanol. In addition, 0.1 to 3 mole percent of a polyol may be added to introduce some crosslinks in the polymer. Examples of these include trimethylolethane, trimethylolpropane and pentaerythritol.

The polyester glycols are prepared from aliphatic diols and aliphatic dicarboxylic acids by conventional procedures:

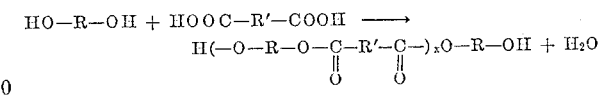

wherein R is a straight-chain or branched-chain alkylene radical containing from 2 to 20 carbon atoms and R' is a straight-chain or branched-chain alkylene radical containing from 0 to 20 carbon atoms and $x$ is an integer selected to give a polyester having a molecular weight of about 500 to about 5000. The polyester may contain from 0.1 to 25.0 mole percent of an unsaturated dicarboxylic acid such as maleic, fumaric, itaconic, 3-cyclohexene-1,2-dicarboxylic, and bicyclo[2.2.1]-5-heptene-2,3-dicarboxylic acids. Polymers containing this type of unsaturation can be crosslinked by suitable treatments. Depending upon the amount of crosslinking which is introduced, the properties of elastomers can be modified appreciably. When the elastomers are sufficiently crosslinked, their resistance to solvents is enhanced to a degree even greater than that which is imparted by the crystallinity derived from the 5,6,7,8-tetrahydro-1,4-naphthalenediol units in the molecule. A calculated molar excess of the diol over the dicarboxylic acid is used in order to obtain hydroxy-terminated polyesters. Copolyester glycols also may be used, such as a copolymer prepared from ethylene glycol, 1,9-nonanediol, and azelaic acid or a copolymer prepared from 1,6-hexanediol, adipic acid and sebacic acid. Also these copolymers may be prepared with alicyclic diols (such as 1,3- and 1,4-cyclohexanediol and 2,5- and 2,6-norbornanediol) or with cycloaliphatic diols (such as 1,3- and 1,4-cyclohexanedimethanol and 2,5- and 2,6-norbornanedimethanol). In addition, 0.1 to 3 mole percent of a polyol may be added to introduce some crosslinks in the polymer. The copolymers may be prepared with dicarboxylic acids which are alicyclic, cycloaliphatic, or aromatic. In addition, 0.1 to 3 mole percent of a polycarboxylic acid may be added, such as 1,3,5-benzenetricarboxylic acid, to introduce some crosslinks in the polymer.

The aliphatic polycarbonate glycols are prepared from aliphatic diols and phosgene or aliphatic diols and a dialkyl carbonate:

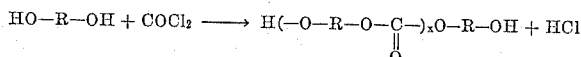

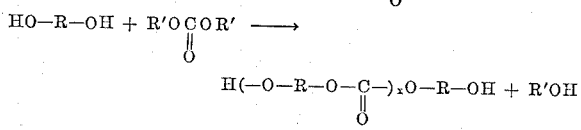

wherein R is a straight-chain or branched-chain alkylene radical containing from 4 to 20 carbon atoms, R' is an alkyl radical containing from 1 to 6 carbons and $x$ is an integer selected to give a polycarbonate having a molecular weight of about 500 to about 5000. The diols may be primary or secondary and may contain from 4 to 20 carbon atoms. A calculated molar excess of the diol is used in order to obtain hydroxy-terminated polymers. Except for diols containing less than 4 carbon atoms, the same diols used in preparing polyester glycols may be used in preparing these aliphatic polycarbonate glycols, which include copolycarbonate glycols When the phosgene method is used to prepare the aliphatic polycarbonate glycols, it is convenient to carry out the reaction in the presence of a tertiary amine, such as pyridine, which acts as an acid acceptor.

The poly(etherurethane) glycols are prepared from diisocyanates and short-chain, hydroxy-terminated polyethers:

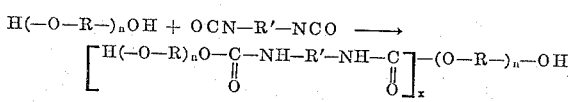

wherein R is a straight-chain or branched-chain alkylene radical containing from 2 to 4 carbon atoms and R' is selected from the group consisting of straight-chain and branched-chain alkylene radicals containing from 2 to 20 carbon atoms, phenylene and tolylene radicals, and methylenebisphenylene radicals and $x$ is an integer selected to give a poly(etherurethane) having a molecular weight of about 1500 to about 5000. Chloroformates of poly(etherurethane) glycols are prepared from diamines and the bischloroformates of short-chain, hydroxy-terminated polyethers:

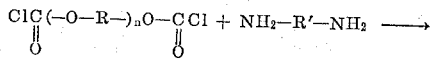

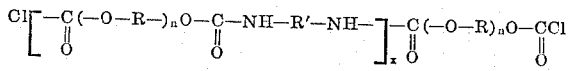

wherein R is a straight-chain or branched-chain alkylene radical containing from 2 to 4 carbon atoms and R' is selected from the group consisting of straight-chain and branched-chain alkylene radicals containing from 2 to 20 carbon atoms, phenylene and tolylene radicals, and methylenebisphenylene radicals and $x$ is an integer selected to give a poly(ether urethane) having a molecular weight of about 1500 to about 5000. A calculated molar excess of the hydroxy-terminated or chloroformate-terminated polyether is used to give the proper molecular weight of the urethane polymer. Hydroxy-terminated polyesters (or their chloroformates) which may be used are polyethylene oxide, polypropylene oxide, poly(1,2-butylene oxide), and poly(tetramethylene oxide). The molecular weights of these polyethers may be 300–1000. Enough units are linked together by the diisocyanate or diamine to give short-chain polymers with average molecular weights of 1500–5000 and preferably 2000–3000. The diisocyanate may be aliphatic (straight- or branched-chain) and may contain 2–20 carbon atoms. The diisocyanates also may alicyclic or aromatic. Diamines which may be used to link the bischloroformates together may be aliphatic (straight- or branched-chain) and may contain 2–20 carbon atoms. The diamines also may be alicyclic or aromatic.

Bischloroformates of all of the polymer glycols just discussed are prepared by dissolving the polymers in an inert solvent such as ethylene dichloride or dioxane and passing in phosgene in excess of that theoretically required.

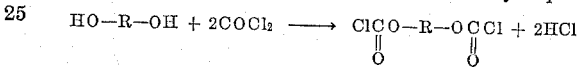

The solution is allowed to stand overnight, and then the hydrogen chloride which was formed and the excess phosgene are removed by passing in nitrogen. The chloroformate solution is then placed in a volumetric flask and aliquot portions are used as needed.

The carbonyl halide, which is added to the solution of tetrahydronaphthalenediol, aromatic diol and polymer glycol, may be either phosgene or bromophosgene although the former is preferred. The carbonyl halide is preferably added as a 10 percent solution in a solvent such as ethylene dichloride and is usually added in an amount of about 10 percent excess over the theoretical amount required.

The elastomeric polycarbonates are prepared by either the interfacial method or the tertiary amine procedure. In the interfacial process, phosgene and the bischloroformate of the polymer glycol are added to a mixture containing the tetrahydronaphthalenediol, the aromatic diol, aqueous sodium hydroxide, a solvent such as methylene chloride and a catalyst (tertiary amine or quarternary ammonium salt). The combined molar amounts of the phosgene and bischloroformate are in slight excess over the molar amount of the aromatic diols. When the elastomer comprises less than about 18 weight percent of units derived from a 5,6,7,8-tetrahydro-1,4-naphthalenediol, the polymer is soluble in the methylene chloride, which solution becomes viscous as the polymer builds up.

The tertiary amine process is the preferred method for preparing the polycarbonate elastomers of this invention. Pyridine is the preferred amine, but other amines which may be used are triethylamine, tributylamine, and N,N-dimethylaniline. It is preferable, but not necessary that a solvent for the polymer, such as methylene chloride, be present. The reaction may be carried out at about 0–50° C. It is most convenient for the temperature to be held at about 20–30° C. Since the tetrahydronaphthalenediols are oxidized by air, especially in basic media, it is preferable to prepare the polymer in an inert atmosphere such as nitrogen.

In one embodiment of this invention phosgene is added to a solution containing a tertiary amine, the tetrahydronaphthalenediol, the aromatic diol and the polymer glycol. By this procedure a somewhat random copolymer is obtained. In another embodiment of the invention phosgene is added to a solution of the aromatic diols in a tertiary amine to form a short-chain polycarbonate containing aromatic diol and tetrahydronaphthalenediol units. The bischloroformate of the polymer glycol is then added, and a block polymer is obtained. Another procedure for obtaining a block polymer is to add the glycol bischloroformate to the tetrahydronaphthalenediol and the aromatic diol in a tertiary amine and then to add phosgene.

Usually it is necessary to add slightly over the theoretical amount of carbonyl halide or carbonyl halide plus bischloroformate to obtain a high polymer. Build-up of the polymer is indicated by an increase in viscosity of the amine solution. At the completion of the polymerization the solution is poured into water, which dissolves the amine hydrochloride and the excess amine. If no other solvent, such as methylene chloride, is present, the polymer precipitates. Better washing can be obtained if a water-immiscible solvent, such as methylene chloride, is present with the tertiary amine. The polymer solution can then be thoroughly washed with water. The polymer is precipitated by adding the solution to acetone, methanol, or other non-solvent. As the number of units in the elastomer, derived from a tetrahydronaphthalenediol, reaches about 18 weight percent the polymer becomes increasingly insoluble in conventional hydrocarbon, halogenated hydrocarbon and other solvents. Thus when about 18 to 25 weight percent of the elastomer consists of tetrahydronaphthalenediol-derived units, the polymer is not soluble in such solvents as chloroform and methylene chloride and is only slightly affected by perchloroethylene. When the polymer contains more than about 25 weight percent of tetrahydronaphthalenediol-derived units, it is insoluble even in tetrachloroethane. Accordingly, although the polymers may be prepared in a methylene chloride solution or in a pyridine/methylene chloride solution, after the polymer is washed and precipitated it cannot be redissolved unless the amount of tetrahydronaphthalenediol used was low.

At the lower tetrahydronaphthalenediol concentrations described above, the polymers may be obtained from solution in the form of fibers and films. At higher tetrahydronaphthalenediol concentrations the elastomers must be melt-spun. Films and molded objects may also be obtained by extrusion from the melt. The fibers and films obtained from the melt generally have higher elongations than those which are obtained from solution.

When the polymer glycol unit consists of a polyether or polyformal, it is advantageous to add a phenolic antioxidant to the elastomer solution before the precipitation step so that the precipitated polymer will contain some antioxidant. The antioxidant can also be added to the elastomer by conventional techniques. It is sometimes advantageous to add a fine powder such as titanium dioxide or talc before the elastomers are wet-spun, dry-spun, or melt-spun. The powder helps to prevent filaments which are tacky from sticking together.

The inherent viscosities of these elastomeric polycarbonates may be 0.50 or greater; however, for optimum results the inherent viscosities should be above 2.0.

For purposes of clarity and of properly disclosing and defining our invention, the following definitions are given:

*Inherent viscosity.*—This property, used as a measure of the degree of polymerization of a polymeric compound, is defined as: $ln\eta_r/C$ wherein $\eta_r$ is the viscosity of a dilute (approximately 0.25 percent by weight) solution of the polymer in tetrachloroethane divided by the viscosity of the solvent, and C is the concentration of the polymer in grams per 100 cc. of the solution.

*Tenacity.*—This is a measure of the strength of the fiber, filament, or yarn under study. Expressed in grams per denier, it is calculated by dividing the initial denier of the fiber under study into the tension (in grams) required to break the yarn. The values reported in this invention were determined on 2-inch specimens at a rate of extension of 1000 percent per minute in an Instron Tester manufactured by Instron Engineering Corporation, 2500 Washington St., Canton, Mass.

*Elongation.*—This is a measure of the extent to which a fiber, filament, or yarn is stretched when it breaks. Expressed in percent, it is calculated by dividing the original length into the increase in length and multiplying by 100.

Because of the high elongations of elastomeric yarns, the fiber samples suffer a marked diminution of their diameters during their elongation. Thus, samples mounted in the jaws of an Instron Tester have a tendency to slip during the stretching, and elongations determined in this manner are frequently larger than their true values. A more reliable value is obtained by stretching the fiber sample by hand. The elongations reported in this invention were obtained by placing two marks 20 cm. apart on the fiber sample and extending the sample by hand until it broke. The distance which separated the marks at the time of breakage was noted and the elongation calculated. The average of several determinations was used as the value of the sample in question.

*Elastic recovery.*—This property is a measure of the ability of a fiber, yarn, or filament to return to its original length after elongation. The percent elastic recovery is obtained by dividing the original elongation into the elongation which is recovered after 1 minute and multiplying by 100. Thus, if a fiber sample 25 cm. in length is stretched 400 percent to 125 cm. and it recovers to 30 cm. in length after 1 minute, the original elongation is 100 cm. and the elongation which is recovered is 95 cm. The elastic recovery is, therefore, 95 percent. The elastic recovery of films is similarly determined.

The following examples illustrate the best modes contemplated for carrying out the invention:

EXAMPLE 1

An amount of 12 g. (0.073 mole) of 5,6,7,8-tetrahydro-1,4-naphthalenediol, 12 g. (0.053 mole) of 4,4'-isopropylidenediphenol and 36 g. (0.0086 mole) of a copolyether glycol, having an average molecular weight of 4200 and containing 94 percent by weight of tetramethylene oxide units from tetrahydrofuran and 6% by weight of units from 8-oxabicyclo[4.3.0]nonane, was placed in a 1 liter, three-necked flask. The air in the flask was displaced with nitrogen and 60 ml. of dry pyridine and 200 ml. of methylene chloride were added. While the reaction mixture was rapidly stirred, the temperature was held at 20–30° C. with a cold water bath, and a 10% solution of phosgene in ethylene dichloride was slowly added. When about 95% of the theoretical amount of phosgene had been added, the phosgene solution was added very slowly, a drop at a time, until the polymer had built up to a high molecular weight (indicated by a highly viscous solution). The mixture was then poured into a large volume of water, methylene chloride was added to dilute the organic layer and hydrochloric acid was added until the pH of the stirred mixture was 1.5. The methylene chloride layer was then thoroughly washed with water and about 2 g. of didodecyl-p-cresol and 2 g. of dilauryl thiodipropionate were added and the solution was added with stirring to a 50/50 mixture of acetone/methanol to precipitate the elastomer.

The inherent viscosity of the polymer, measured in tetrachloroethane, was 2.4. The polymer was insoluble in methylene chloride or chloroform. The polycarbonate elastomer product contained 20 weight percent of 5,6,7,8-tetrahydro-1,4-naphthalenediol, 20 weight percent of 4,4'-isopropylidenediphenol and 60 weight percent of the copolyether glycol.

Upon being wet-spun from the tetrachloroethane dope into ethyl alcohol, the polymer fibers obtained had a tenacity of 0.7 g./den., an elongation of 610%, and an elastic recovery of 98% from an elongation of 400%.

When the above fibers were stretched 50% and then heat-set at constant length for 20 min. at 120° C., the tenacity was increased to 1.0 g./den., the elongation was decreased to 500% and the elastic recovery from an elongation of 400%, was increased to 99%.

When the fibers were drafted 100% immediately after spinning and then heat-set by passing through a cabinet at 95° C., the tenacity was increased to 1.4 g./den., the elongation was reduced to 430% and the elastic recovery, from an elongation of 400% was increased to 100%. The flow point of the fibers was 203° C.

EXAMPLE 2

In accordance with the procedure of Example 1, a polycarbonate elastomer was prepared which contained 10 weight percent of 5,6,7,8-tetrahydro-1,4-naphthalenediol, 30 weight percent of 4,4'-(2-norbornylidene)bis[2,6-dichlorophenol] and 60 weight percent of a copolyether glycol have an average molecular weight of 3800 and containing 94% by weight of tetramethylene oxide units from tetrahydrofuran and 6% by weight of units from 8-oxabicyclo [4.3.0]nonane. The polymer, which had an inherent viscosity of 2.8, was wet-spun from methylene chloride into 80/10/10 ethyl alcohol/methylene chloride/water and was then heat-set by passing through a cabinet at 140° C. The fibers had a tenacity of 0.8 g./den., an elongation of 520% and an elastic recovery of 99% from an elongation of 400%.

EXAMPLE 3

Example 2 was repeated with a 17.5/17.5/65 weight percent ratio of the aromatic diols and copolyether glycol. The polymer, which had an inherent viscosity of 1.6, was soluble in tetrachloroethane but was insoluble in methylene chloride and chloroform. The fibers, obtained by wet-spinning from tetrachloroethane into ethyl alcohol, had a tenacity of 1.0 g./den., an elongation of 720% and an elastic recovery of 100% from an elongation of 300%. A film, cast from tetrachloroethane, was highly elastic. A strip of the film had an elongation of 780%.

EXAMPLE 4

A polycarbonate elastomer containing 15 weight percent of 2-methyl-5,6,7,8-tetrahydro - 1,4 - naphthalenediol and 85 weight percent of poly(tetramethylene oxide) glycol having an average molecular weight of 4800 was prepared in accordance with the method of Example 1. The polymer, which had an inherent viscosity of 1.5, was soluble in tetrachloroethane but insoluble in methylene chloride. A film, cast from tetrachloroethane, had an elongation of 630% and an elastic recovery of 94% from an elongation of 400%.

EXAMPLE 5

A polycarbonate elastomer containing 25 weight percent of 5,8 - dimethyl-5,6,7,8-tetrahydro-1,4-naphthalenediol and 75 weight percent of the hydroxy-terminated polyformal of 1,10-decanediol (molecular weight 2000) was prepared in accordance with the method of Example 1. The polymer had an inherent viscosity of 1.4 and was insoluble in methylene chloride. A film, cast from tetrachloroethane, was highly elastic.

EXAMPLE 6

An elastomer containing 40 weight percent of 6,7-dimethyl - 5,6,7,8 - tetrahydro - 1,4 - naphthalenediol and 60 weight percent of poly(tetramethylene oxide) glycol (average molecular weight 1600), which was added as the bischloroformate, was prepared in accordance with method of Example 1. The polymer was insoluble in methylene chloride and was only partially soluble in tetrachloroethane. Fibers with good elastomeric properties were obtained by melt-spinning.

EXAMPLE 7

An elastomer containing 17.5 weight percent of 2,3-dichloro - 5,6,7,8 - tetrahydro - 1,4 - naphthalenediol, 17.5 weight percent of 4,4'-isopropylidenediphenol and 65 weight percent of poly(tetramethylene oxide) glycol (average molecular weight 4000) was prepared in accordance with the method of Example 1. The polyether glycol was added as the bischloroformate before addition of the phosgene solution. The polymer, which had an inherent viscosity of 2.2, was insoluble in methylene chloride. Fibers were obtained by wet-spinning from tetrachloroethane solution into ethyl alcohol. The fibers had a tenacity of 0.8 g./den., an elongation of 760% and an elastic recovery of 99% from an elongation of 400%.

EXAMPLE 8

An elastomer containing 25 weight percent of 5,6,7,8-tetrahydro-1,4-naphthalenediol, 25 weight percent of 4,4'-isopropylidenediphenol and 50 weight percent of the hydroxy-terminated polyester from 1,5-pentanediol and azelaic acid (added as the bischloroformate having an average molecular weight of 1400) was prepared in accordance with the method of Example 1. The reaction mixture was stirred for 5 minutes after addition of the bischloroformate and before addition of the phosgene solution. The polymer, which had an inherent viscosity of 2.4, was soluble in tetrachloroethane but insoluble in methylene chloride. A film, cast from tetrachloroethane, had an elongation of 440% and was elastic.

EXAMPLE 9

An elastomer containing 20 weight percent of 2-methyl-5,6,7,8-tetrahydro-1,4-naphthalenediol, 20 weight percent of 4,4'-(2-norbornylidene)bis[2,6-dichlorophenol] and 60 weight percent of the hydroxy-terminated polyester from diethylene glycol and dodecanedioic acid (average molecular weight of 4200) was prepared in accordance with the method of Example 1. The polymer had an inherent viscosity of 1.6 and was soluble in tetrachloroethane but insoluble in methylene chloride. Fibers, obtained by wet-spinning into ethyl alcohol and heat-setting at 120° C., had a tenacity of 1.1 g./den., an elongation of 500% and an elastic recovery of 99% from an elongation of 400%.

EXAMPLE 10

An elastomer containing 30 weight percent of 5,6,7,8-tetrahydro-1,4-naphthalenediol and 70 weight percent of the hydroxy-terminated polycarbonate from 1,10-decanediol (average molecular weight of 4200) was prepared in accordance with the method of Example 1. The polymer had an inherent viscosity of 2.2, and was soluble in tetrachloroethane but insoluble in methylene chloride. A film, cast from tetrachloroethane, had good elastomeric properties.

EXAMPLE 11

Example 8 was repeated, using the hydroxy-terminated polycarbonate from 1,5-pentanediol (having an average molecular weight of 2000) in place of the hydroxy-terminated polyester of Example 8. The polymer obtained had an inherent viscosity of 1.4 and was soluble in tetrachloroethane. A film, cast from this solvent, had an elongation of 400% and was elastic.

EXAMPLE 12

A short-chain, hydroxy-terminated poly(ether urethane) was prepared from a 3/2 molar ratio of poly(tetramethylene oxide) glycol having a molecular weight of 900 and hexamethylene diisocyanate by heating the components together at 100° C. for 1 hour. An elastomer was then prepared from 55 weight percent of the poly(ether urethane), 25 weight percent of 5,6,7,8-tetrahydro-1,4-naphthalenediol and 20 weight percent of 4,4'-isopropylidenediphenol in accordance with the method of Example 1. The polymer had an inherent viscosity of 1.5. The polymer was insoluble in methylene chloride but highly elastic fibers and films were obtained by spinning or casting from tetrachloroethane.

EXAMPLE 13

In accordance with the procedure of Example 12, an elastomer was prepared containing 25 weight percent of 2,3 - dichloro - 5,6,7,8 - tetrahydro - 1,4 - naphthalenediol and 75 weight percent of the urethane product from a 4/3 molar ratio of polypropylene oxide glycol having a molecular weight of 650 and tolylene-2,4-diisocyanate.

The polymer was soluble in tetrachloroethane but insoluble in methylene chloride. The polymer had good elastomeric properties.

The elastomeric fibers of this invention are characterized by exceptionally high elastic recovery: 100 percent in many cases from elongations of 300–400 percent. The ultimate elongation of the fibers is primarily dependent upon the number of polymer glycol units in the elastomer molecule and may range up to 600 percent or higher in many cases. The fibers also have high tenacities and excellent resistance to drycleaning solvents, such as perchloroethylene.

The elastomers of this invention may be stabilized by incorporating conventional stabilizers therein. Satisfactory stabilizers include phenols, phenolic derivatives, aromatic amines, amino derivatives, and thio compounds. Preferred stabilizers are 2,4,6-trialkylated phenols such as 2,6 - di - n - dodecyl - p - cresol, 2,6 - di(1 - methylheptadecyl) - p - cresol, 2 - methyl - 6 - octadecyl - p - cresol and dilauryl thiodipropionate.

The elastomeric filaments, fibers, yarns, films and other shaped objects which may be obtained from the polymers of this invention are useful in the fabrication of many articles, such as brassieres, girdles, garters, sweaters, jackets, ski togs, skirts, hats, gloves, tapes, ribbons, belting, shoe fabrics, upholstery, bandages, hair nets, dish covers, ropes, bindings, balls, fabric coatings, safety glass interlayers, flexible tubing, wire coatings, pipe coverings, packaging materials, gaskets, weather-stripping, paint additives, etc.

We claim:

1. A highly elastic polycarbonate containing the radicals of (A) at least one dihydroxy compound including a tetrahydronaphthalenediol having the general formula:

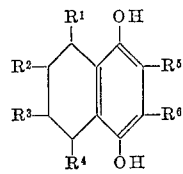

wherein $R^1$, $R^2$, $R^3$ and $R^4$ are selected from the group consisting of hydrogen or alkyl groups of 1 to 4 carbon atoms and $R^5$ and $R^6$ are selected from the group consisting of hydrogen, chlorine, bromine or alkyl groups of 1 to 4 carbon atoms, (B) at least one polymer glycol having an average molecular weight from about 500 to about 5,000 and selected from the group consisting of hydroxy-terminated and chloroformate-terminated polyethers, polyformals, polyesters, aliphatic polycarbonates, and poly(etherurethanes), and (C) a carbonyl halide selected from the group consisting of phosgene and bromophosgene, wherein the final elastomeric product contains from about 5 to about 60 weight percent of the tetrahydronaphthalenediol.

2. The polycarbonate of claim 1 wherein the tetrahydronaphthalenediol is selected from the group consisting of 5,6,7,8-tetrahydro-1,4-naphthalenediol, 2-methyl-5,6,-7,8-tetrahydro - 1,4-naphthalenediol, 5,8-dimethyl-5,6,7,8-tetrahydro - 1,4-naphthalenediol, 6,7-dimethyl - 5,6,7,8-tetrahydro - 1,4-naphthalenediol, or 2,3-dichloro-5,6,7,8-tetrahydro-1,4-naphthalenediol.

3. The polycarbonate of claim 1 wherein the radicals of the tetrahydronaphthalenediol constitute from about 10 to about 25 weight percent of the final polymer.

4. The polycarbonate of claim 1 which includes a dihydroxy compound selected from the group consisting of hydroquinone, resorcinol, naphthalenediol or

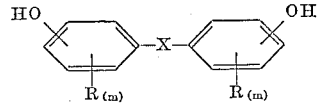

wherein R is hydrogen, chlorine, bromine, nitro, alkyl or alkoxy, x is substituted or nonsubstituted alkyl or cycloalkyl, alkaryl, sulfonyl or radicals having the formulae

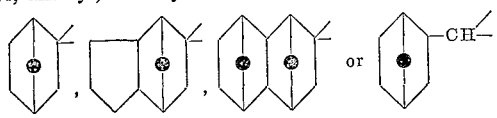

and $m$ is 1, 2 or 3.

5. The polycarbonate of claim 4 wherein the dihydroxy compound is selected from the group consisting of 4,4'-isopropylidenediphenol or 4,4' - (2-norbornylidene) bis[2,6-dichlorophenol].

6. The polycarbonate of claim 2 wherein the polymer glycol has a molecular weight of about 500 to about 5000 and constitutes from about 30 to about 80 weight percent of the final polymer.

7. The polycarbonate of claim 1 wherein the polyether has the formula $$(—O—R)_x$$

wherein R is a straight- or branched-chain alkylene radical of 2 to 20 carbon atoms and $x$ is an integer selected to give a polyether having a molecular weight of about 500 to about 5000.

8. The polycarbonate of claim 1 wherein the polyformal has the formula $$(—O—R—O—CH_2)_x$$

wherein R is a straight- or branched-chain alkylene radical of 4 to 20 carbon atoms and $x$ is an integer selected to give a polyformal having a molecular weight of about 500 to about 5000.

9. The polycarbonate of claim 1 wherein the polyester has the formula $$\left(O—R—O—\underset{\underset{O}{\|}}{C}—R'—\underset{\underset{O}{\|}}{C}\right)_x$$

wherein R is a straight- or branched-chain alkylene radical of 2 to 20 carbon atoms, R' is a straight- or branched-chain hydrocarbon radical of 0 to 20 carbon atoms and $x$ is an integer selected to give a molecular weight of about 500 to about 5000.

10. The polycarbonate of claim 1 wherein the aliphatic polycarbonate has the formula $$\left(—O—R—O—\underset{\underset{O}{\|}}{C}\right)_x$$

wherein R is a straight- or branched-chain alkylene radical of 4 to 20 carbon atoms and $x$ is an integer selected to give a molecular weight of about 500 to about 5000.

11. The polycarbonate of claim 1 wherein the poly(ether urethane) has the formula $$\left[(—O—R)_nO—\underset{\underset{O}{\|}}{C}—NH—R'—NH—\underset{\underset{O}{\|}}{C}\right]_x$$

wherein R is a straight- or branched-chain alkylene radical of 2 to 4 carbon atoms, R' is a straight- or branched-chain alkylene radical of 2 to 20 carbon atoms or a phenylene, tolylene or methylenebisphenylene radical and $x$ is an integer selected to give a molecular weight of about 1500 to about 5000.

12. The polycarbonate of claim 7 wherein the polyether is selected from the group consisting of poly(tetramethylene)oxide glycol, polypropylene oxide glycol or a polyether containing ethylene oxide and tetramethylene oxide units.

13. The polycarbonate of claim 8 wherein the polyformal is a hydroxy-terminated polyformal of 1,10-decanediol.

14. The polycarbonate of claim 9 wherein the polyester is selected from the group consisting of the hydroxy-terminated polyester from 1,5-pentanediol and azelaic acid or the hydroxy-terminated polyester from diethylene glycol and dodecanedioic acid.

15. The polycarbonate of claim 10 wherein the aliphatic polycarbonate is selected from the group consisting of the hydroxy-terminated polycarbonate from 1,10-decanediol or 1,5-pentanediol.

16. The polycarbonate of claim 11 wherein the poly(ether urethane) is selected from the group consisting of the poly(ether urethane) from polypropylene oxide and tolylene-2,4-diisocyanate or from poly(tetramethylene oxide) glycol and hexamethylene diisocyanate.

17. Fibers, filaments, yarns and films formed from the polycarbonate of claim 1.

18. The method of claim 19 wherein the solution contains a dihydroxy compound selected from the group consisting of hydroquinone, resorcinol, naphthalenediol or

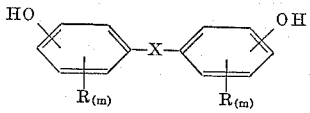

wherein R is hydrogen, chlorine, bromine, nitro, alkyl or alkoxy, $x$ is substituted or nonsubstituted alkyl or cycloalkyl, alkaryl, sulfonyl or radicals having the formulae

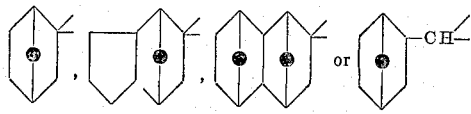

and $m$ is 1, 2 or 3.

19. The method of producing a highly elastic polycarbonate, said method comprising (1) preparing a basic solution of (A) at least one dihydroxy compound including a tetrahydronaphthalenediol as defined by claim 1 and (B) at least one polymer glycol having an average molecular weight from about 500 to about 5,000 and selected from the group consisting of hydroxy-terminated and chloroformate-terminated polyethers, polyformals, polyesters, aliphatic polycarbonates, and poly(ether-urethanes), (2) contacting the solution with a carbonyl halide selected from the group consisting of phosgene and bromophosgene, and (3) recovering the highly elastic polycarbonate from the solution, wherein the final elastomeric product contains from about 5 to about 60 weight percent of the tetrahydronaphthalenediol.

References Cited

UNITED STATES PATENTS 3,287,442    11/1966    Caldwell _____ 260—858

MURRAY TILLMAN, *Primary Examiner.*

P. LIEBERMAN, *Assistant Examiner.*